US012576502B2

(12) United States Patent
Zimmermann et al.

(10) Patent No.: US 12,576,502 B2
(45) Date of Patent: Mar. 17, 2026

(54) POWER TOOL

(71) Applicant: Black & Decker Inc., New Britain, CT (US)

(72) Inventors: Dominic Zimmermann, Kelkheim (DE); Uwe Nemetz, Hunfelden (DE)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 18/321,119

(22) Filed: May 22, 2023

(65) Prior Publication Data

US 2023/0373074 A1 Nov. 23, 2023

(30) Foreign Application Priority Data

May 23, 2022 (GB) ..................................... 2207484

(51) Int. Cl.
*B25F 5/00* (2006.01)

(52) U.S. Cl.
CPC .............. *B25F 5/008* (2013.01); *B25F 5/006* (2013.01)

(58) Field of Classification Search
CPC ................................. B25F 5/006; B25F 5/008
See application file for complete search history.

(56) References Cited

U.S. PATENT DOCUMENTS

| | | | | |
|---|---|---|---|---|
| 6,314,922 | B1 | 11/2001 | Zimmermann et al. | |
| 2009/0145621 | A1 | 6/2009 | Lau et al. | |
| 2017/0239802 | A1* | 8/2017 | Aoki | B25F 5/008 |
| 2021/0039242 | A1 | 2/2021 | Ogura | |
| 2021/0283762 | A1* | 9/2021 | Kusumoto | B25F 5/008 |

FOREIGN PATENT DOCUMENTS

EP 3208049 B1 5/2018

OTHER PUBLICATIONS

EP ESR dated Sep. 25, 2023 in corresponding EP application No. 23171468.4, 8 pages.

* cited by examiner

*Primary Examiner* — Thomas M Wittenschlaeger
(74) *Attorney, Agent, or Firm* — Rhonda L. Barton

(57) ABSTRACT

A power tool comprises a housing and an inner mechanism mounted at least partially within the housing. The inner mechanism is configured to be reciprocally moveable with respect to the housing and the inner mechanism has a motor fan assembly. The power tool comprises an air inlet and an air outlet positioned in the housing and a cooling airflow path extending between the air inlet and the air outlet via the motor fan assembly. The power tool also comprises at least one air conduit located on the airflow path configured to guide the cooling airflow from the air inlet to the motor fan assembly wherein a first end of the air conduit is fixed and a second end of the at least one air conduit is a free end.

18 Claims, 11 Drawing Sheets

POWER TOOL

CROSS-REFERENCE TO RELATED APPLICATIONS

This application claims priority, under 35 U.S.C. § 119, to UK Patent Application No. 2207484.3 filed May 23, 2022, which is incorporated herein by reference in its entirety.

FIELD OF THE INVENTION

The present disclosure relates to a power tool. In particular the present disclosure relates to an air conduit for cooling a motor fan assembly in a power tool.

BACKGROUND OF THE INVENTION

Some professional demolition and construction tools are required to perform heavy duty tasks such as breaking concrete etc. One such tool is a demolition hammer power tool which comprises a reciprocating hammer operatively coupled to a motor. During operation, the motor may experience high load conditions, and this may mean that the motor will get hot during operation. In order to ensure the motor performs under optimal conditions during operation the motor is cooled.

It is known to cool the motor with a fan which draws a cooling airflow over the motor during operation. For example, EP 1637288 discloses an electric hand tool with air intake openings for a fan. The electric hand tool comprises a cool air pipe having an elastic section which connects the air intake openings from an outer housing to the motor.

A problem with this arrangement is that the movement of the hammer causes the elastic section to stretch and compress during each reciprocating movement of the hammer. The elastic section must be durable, but the reciprocating movement may still cause excessive wear on the elastic section which can require maintenance or even break. A user of the hammer power tool may not know that the elastic section has failed, and subsequent use of hammer power tool can overheat the motor during operation. This can lead to catastrophic failure of the demolition power tool.

BRIEF SUMMARY OF THE INVENTION

Examples of the present disclosure aim to address the aforementioned problems.

According to an aspect of the present disclosure there is a power tool comprising: a housing; an inner mechanism mounted at least partially within the housing and configured to be reciprocally moveable with respect to the housing, the inner mechanism having a motor fan assembly; an air inlet and an air outlet positioned in the housing and a cooling airflow path extending between the air inlet and the air outlet via the motor fan assembly; and at least one air conduit located on the airflow path configured to guide the cooling airflow from the air inlet to the motor fan assembly wherein a first end of the air conduit is fixed and a second end of the at least one air conduit is a free end.

Optionally, the first end of the at least one air conduit is fixed with respect to the motor fan assembly.

Optionally, the second end of the at least one air conduit is moveable with respect to the housing.

Optionally, the second end of the at least one air conduit is slidably engageable with an inner surface of the housing.

Optionally, the second end of the at least one air conduit is configured to form a seal against the inner surface of the housing.

Optionally, the second end of the at least one air conduit comprises a lip configured to wipe the inner surface of the housing.

Optionally, the inner surface comprises an air hole.

Optionally, the second end of the at least one air conduit is configured to move from a first position to a second position and the second end and the second end covers the air hole.

Optionally, the at least one air conduit is flexible.

Optionally, the at least one air conduit comprises bellows.

Optionally, the at least one air conduit is a rubber, rubber-like materials, thermoplastic elastomers (TPE), or silicone material.

Optionally, the at least one air conduit comprises a pressure differential with respect to atmospheric pressure when the motor fan assembly is actuated.

Optionally, the inner mechanism is configured to reciprocally move in a direction parallel with a longitudinal axis of the power tool.

Optionally, the at least one air conduit is configured to slidably engage with an inner surface of the housing in a direction parallel with the longitudinal axis.

Optionally, the air inlet is mounted on a side of the housing.

Optionally, the inner mechanism comprises at least one dampener configured to engage the housing when the inner mechanism moves with respect to the housing.

Optionally, the first end of the air conduit comprises a groove configured to mount on a reciprocal projecting rib on a motor housing of the motor fan assembly.

Optionally, the power tool is a demolition hammer, plunge saw, a reciprocating saw, a circular saw, an impact driver, a drill, a hammer drill, a multitool, an oscillating tool, a rotary hammer, a chipping hammer, a plate compactor, a rammer, a tamper, a soil compactor, a pavement breaker or any other power tool.

BRIEF DESCRIPTION OF THE DRAWINGS

Various other aspects and further examples are also described in the following detailed description and in the attached claims with reference to the accompanying drawings, in which:

DETAILED DESCRIPTION OF THE INVENTION

Figure 1:
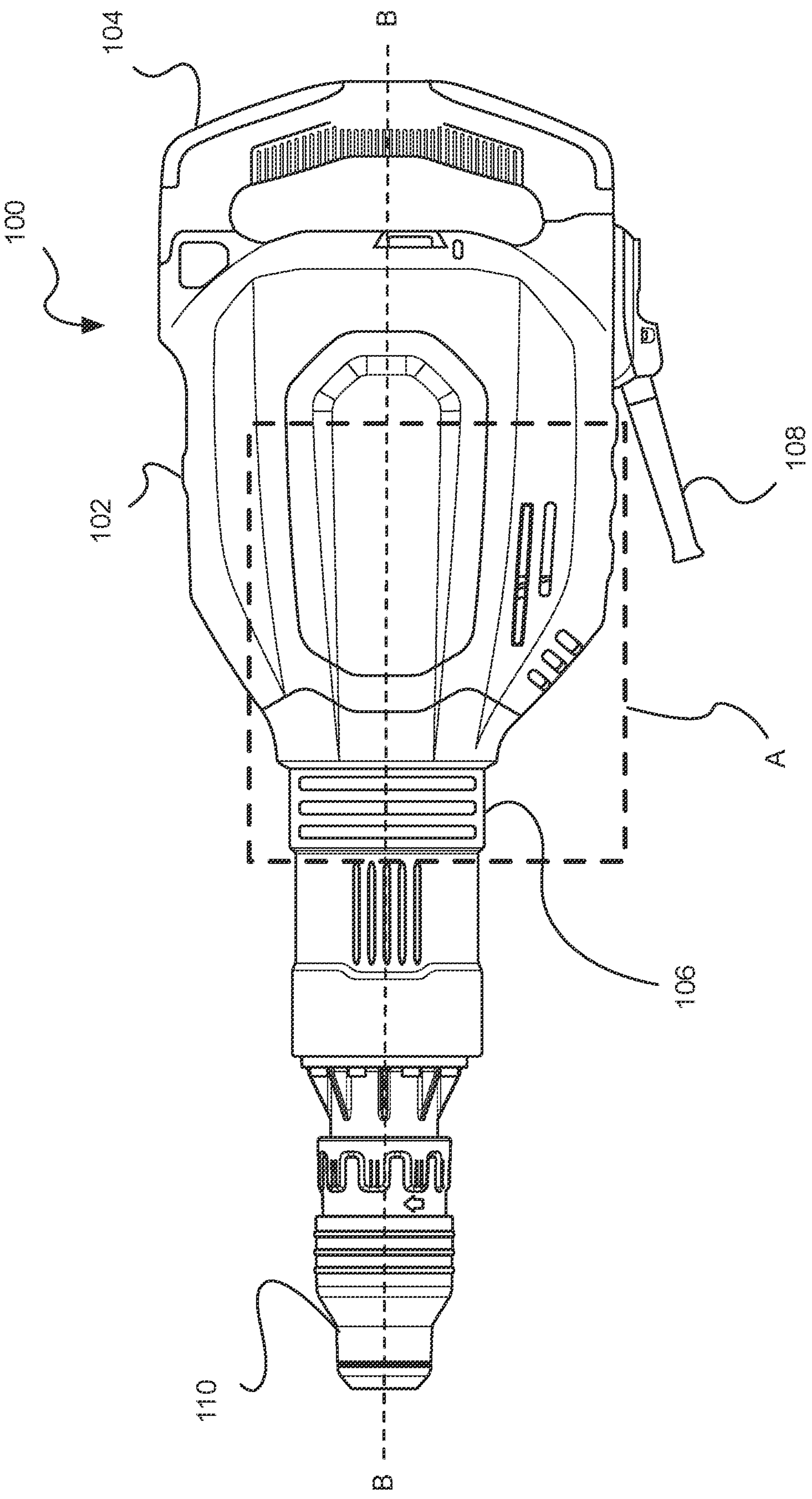
FIG. 1 shows a side view of a power tool according to an embodiment.

FIG. 1 shows a side view of a power tool 100. The power tool 100 as shown in FIG. 1 is a demolition hammer. Whilst FIG. 1 shows a demolition hammer, in other examples any other type of power tool 100 can be used. For example, the power tool 100 can be a plunge saw, a reciprocating saw, a circular saw, an impact driver, a drill, a hammer drill, a multitool, an oscillating tool, a rotary hammer, a chipping hammer, a plate compactor, a rammer, a tamper, a soil compactor, a pavement breaker or any other power tool.

The power tool 100 comprises a housing 102. The housing 102 comprises a clam shell type construction having two halves which are fastened together. The halves of the housing 102 are fastened together with screws but in alternative examples any suitable means for fastening the housing 102 together may be used such as glue, clips, bolts and so on. For the purposes of clarity, the fastenings in the housing 102 are not shown in FIG. 1.

Figure 2:
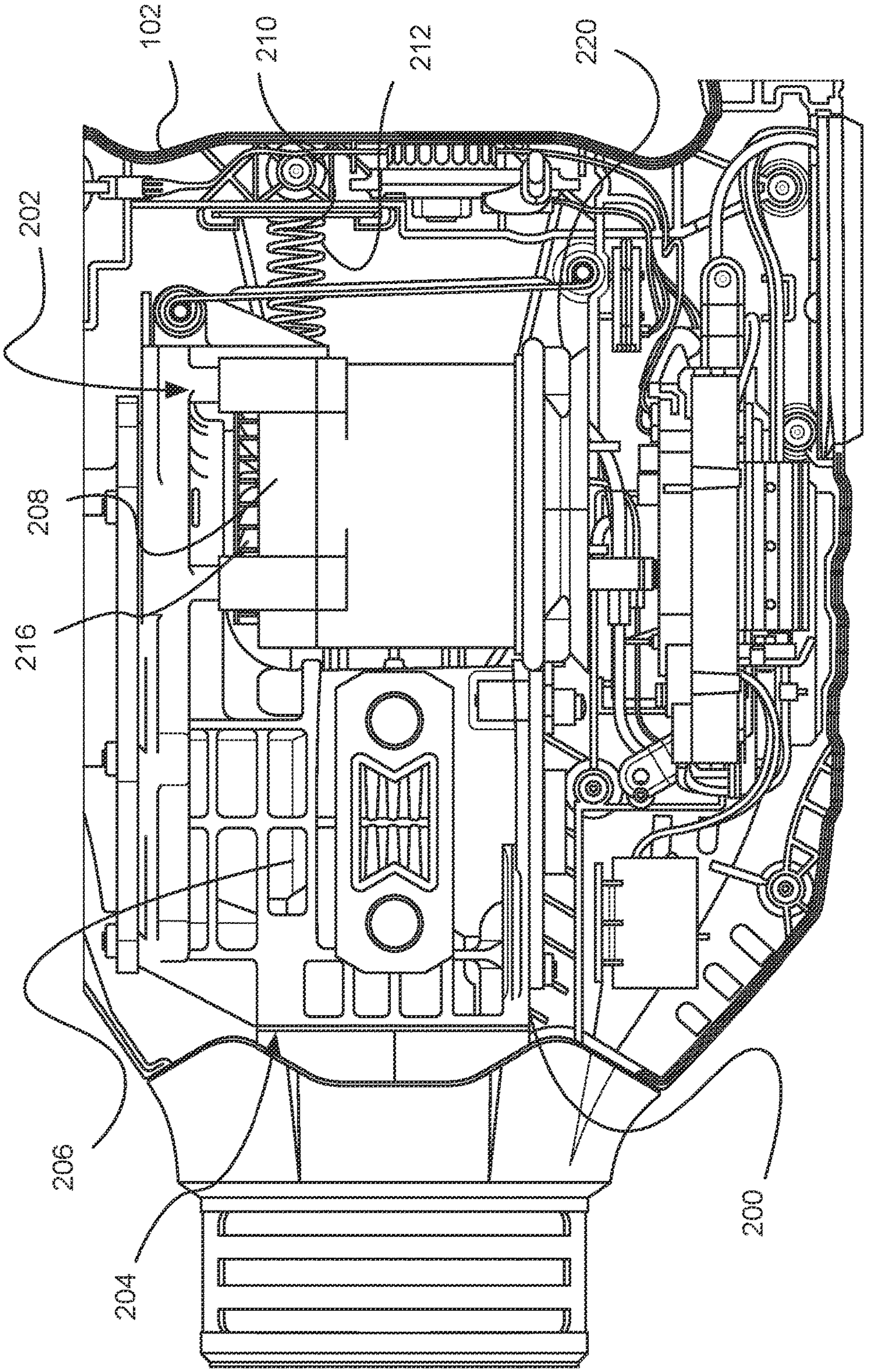
FIG. 2 shows a partial cut away side view of the power tool according to an embodiment.

The housing 102 can comprise a unitary element surrounding the internal components of the power tool 100. In other examples, the housing 102 can comprise one or more housing portions (not shown) which are mounted together to form the housing 102. The housing 102 comprises one or more inner mechanisms 200 (as shown in FIG. 2). The inner mechanism 200 is moveably mounted within the housing 102 and the inner mechanism 200 comprises one or more components operatively coupled to a tool holder 110. The inner mechanism 200 is configured to move with respect to the housing 102 during operation. The inner mechanism 200 will be decoupled from the outer housing 102. This means that the vibrations caused by the power tool 100 can be dampened. The inner mechanism 200 and its functionality will be described in more detail below.

As shown in FIG. 1, the housing 102 comprises a primary handle 104. Optionally a secondary handle (not shown) is also provided for the user to grip during use. Although not shown, optionally, the secondary handle may be mounted on a first side 106 of the housing 102 but alternatively the secondary handle can be mounted on at any location the housing 102. A trigger button (not shown) is mounted on the primary handle 104 (or the secondary handle) which is used by the user to activate a motor assembly 202 (as shown in FIG. 2).

Reference will now be made to FIG. 2 which shows a partial cut away side view of the power tool 100 according to an example. FIG. 2 shows the cut away section of the power tool 100 represented by the dotted box A in FIG. 1. The cut away section as shown in FIG. 2 does not show part of the housing 102 for the purposes of clarity. The motor assembly 202 is electrically connected to a power source 108. In some examples the power source 108 is a wired electrical connection to a main power supply. However, in other examples, the power source 108 can be a battery pack (not shown).

As mentioned above, the inner mechanism 200 comprises the motor assembly 202. In addition, the inner mechanism 200 also comprises a hammer assembly 204. The motor assembly 202 comprises an electric motor 700 (best shown in FIG. 7) which is operatively coupled to the hammer assembly 204. The hammer assembly 204 is housed within a hammer assembly housing 206. The hammer assembly 204 is coupled to the tool holder 110 (as shown in FIG. 1). The hammer assembly 204 generates a reciprocating movement when the electric motor 700 is actuated. This causes the tool holder 110 and the tool to reciprocate. The hammer assembly 204 and the tool holder 110 are known and will not be described in further detail.

Similar to the hammer assembly 204, the motor assembly 202 is housed within a motor housing 208. The motor housing 208 is also shown in more detail in isolation in FIG. 7. The motor housing 208 is coupled to the hammer assembly 204. The motor housing 208 in some examples is fastened directly to the hammer assembly 204. Additionally, or alternatively, the inner mechanism 200 optionally comprises a motor housing frame 708 for securing the motor assembly 202 and the hammer assembly 204. The motor housing frame 708 can secure additional components thereto so that the inner mechanism 200 moves in unison during operation.

As shown in FIG. 2 and mentioned above, the electric motor 700 and the hammer assembly 204 are part of the inner mechanism 200 and are moveably mounted within the housing 102. In this way, the hammer assembly 204 is arranged to reciprocate along a longitudinal axis B-B (as shown in FIG. 1) of the power tool 100.

The hammer assembly 204 is arranged to impart axial impacts onto a cutting tool (not shown) held in the tool holder 110. In some examples, the cutting tool is a chisel bit for cutting stone, concrete, or other hard surfaces. In other examples, the cutting tool can be any other suitable cutting tool for cutting, marking, breaking, drilling a workpiece (not shown) as required. In some examples, the cutting tool comprises a longitudinal axis aligned with the longitudinal axis B-B of the power tool 100.

Figure 8:
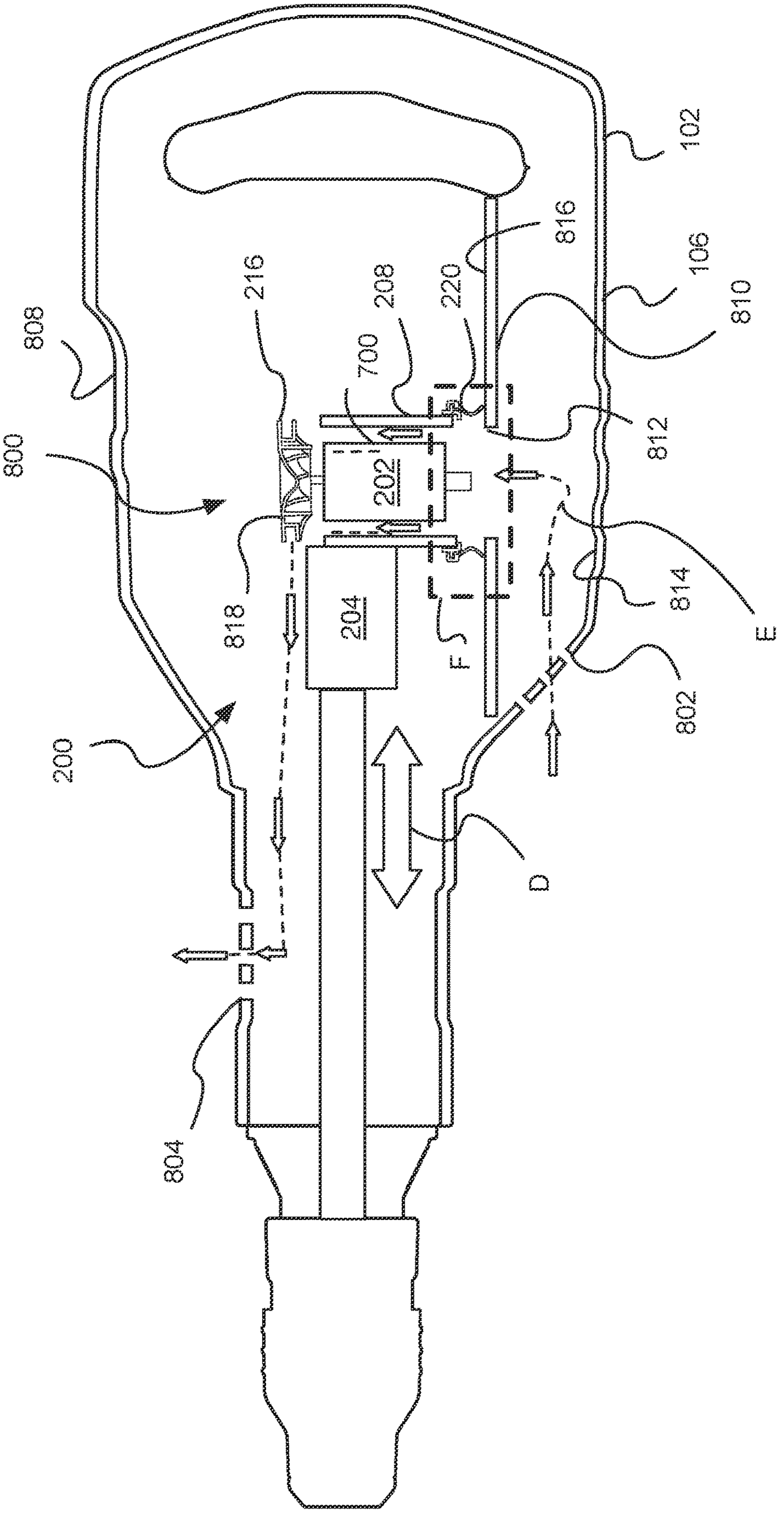
FIG. 8 shows a schematic cross-sectional view of the power tool according to an embodiment.

FIG. 8 shows the inner mechanism 200 and that the inner mechanism 200 reciprocally moves within the housing 102 as shown by double ended arrow D. FIG. 8 shows a schematic cross-sectional view of the power tool 100 according to an example. FIG. 8 shows the fan 216 optionally mounted on the motor 202 so that the fan 216 a first side 818 of the fan 216 faces a first side 106 of the housing 102. This will cause the direction of the airflow to flow from the air inlet 802 to the air outlet 804. In other alternative examples, the fan 216 can be mounted upside down on the motor 202 such that the first side 818 of the fan 216 faces a second side 808 of the housing 102. This will cause the direction of the airflow to flow from the air outlet 804 to the air inlet 802. By mounting the fan 216 with different orientations with respect to the motor 202, the direction of the airflow can be reversed to suit different housing structures.

When the hammer assembly 204 impacts the tool holder 110 and the cutting tool, vibrations and shocks are created in the power tool 100. In order to prevent or limit excessive transmission of the vibrations to the housing 102 and the internal components of the power tool 100, the power tool 100 comprises at least a first dampening system 210 (best shown in FIG. 2).

The first dampening system 210 as shown in FIG. 2 will now be discussed further. The at least one first dampening system 210 comprises a compression spring 212 mounted between the inner mechanism 200 and the housing 102. The compression spring 212 is arranged to be parallel with the longitudinal axis B-B of the power tool 100. Accordingly, when the inner mechanism 200 moves with respect to the housing 102 in the direction along the longitudinal axis B-B, the inner mechanism 200 does not collide with the housing 102. Furthermore, the compression spring 212 dampens most of the vibrations from the inner mechanism 200 due to inertia of the housing 102. The at least one first dampening system 210 can optionally comprise additional compression springs 212. Alternatively, or additionally, the at least one first dampening system 210 can optionally comprise other dampening components such as rubber dampers (not shown) mounted on the inner surface 814 of the housing 102.

Figure 3:
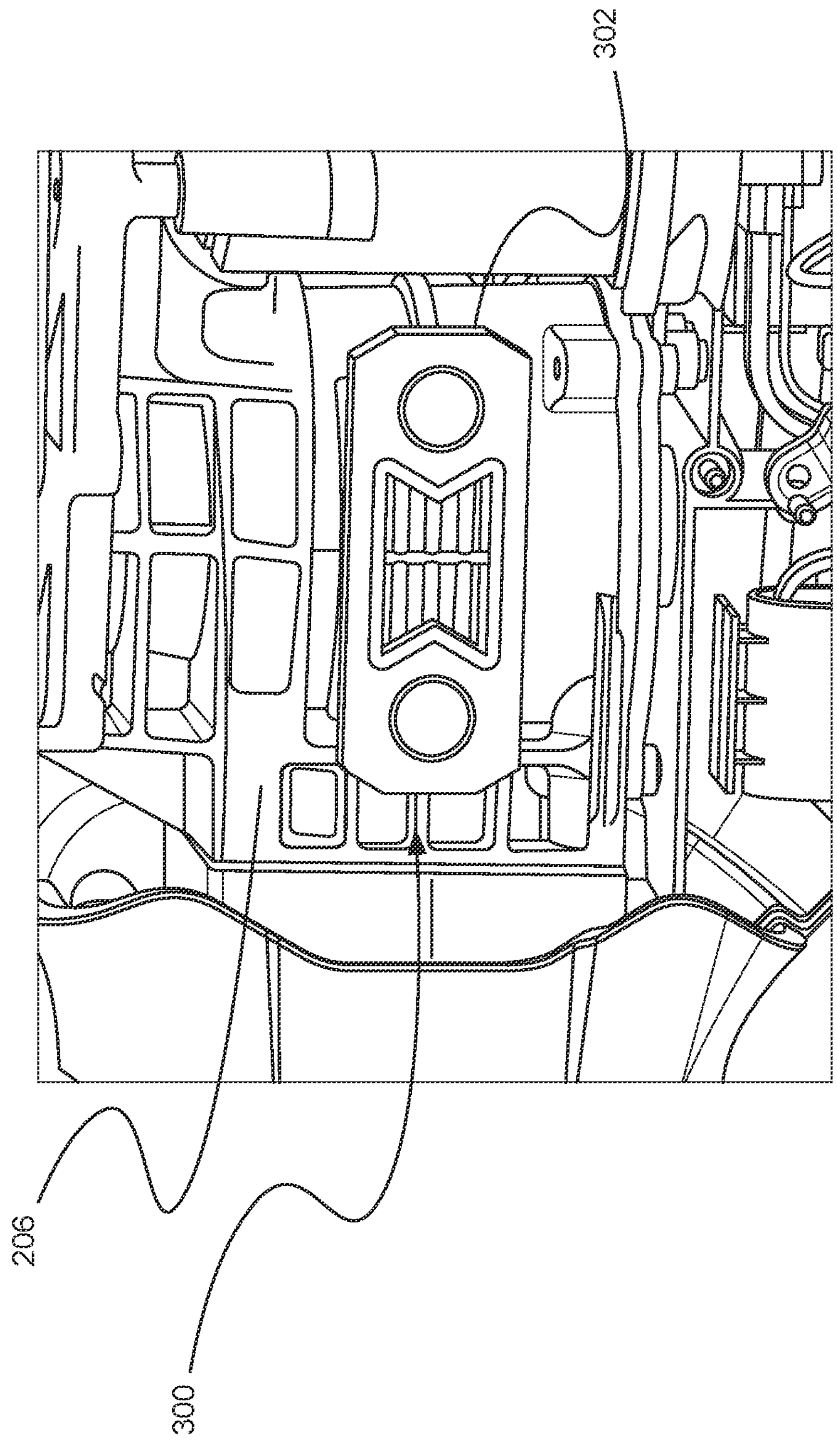
FIG. 3 shows a close-up partial perspective view of an inner mechanism of the power tool according to an embodiment.
Figure 4:
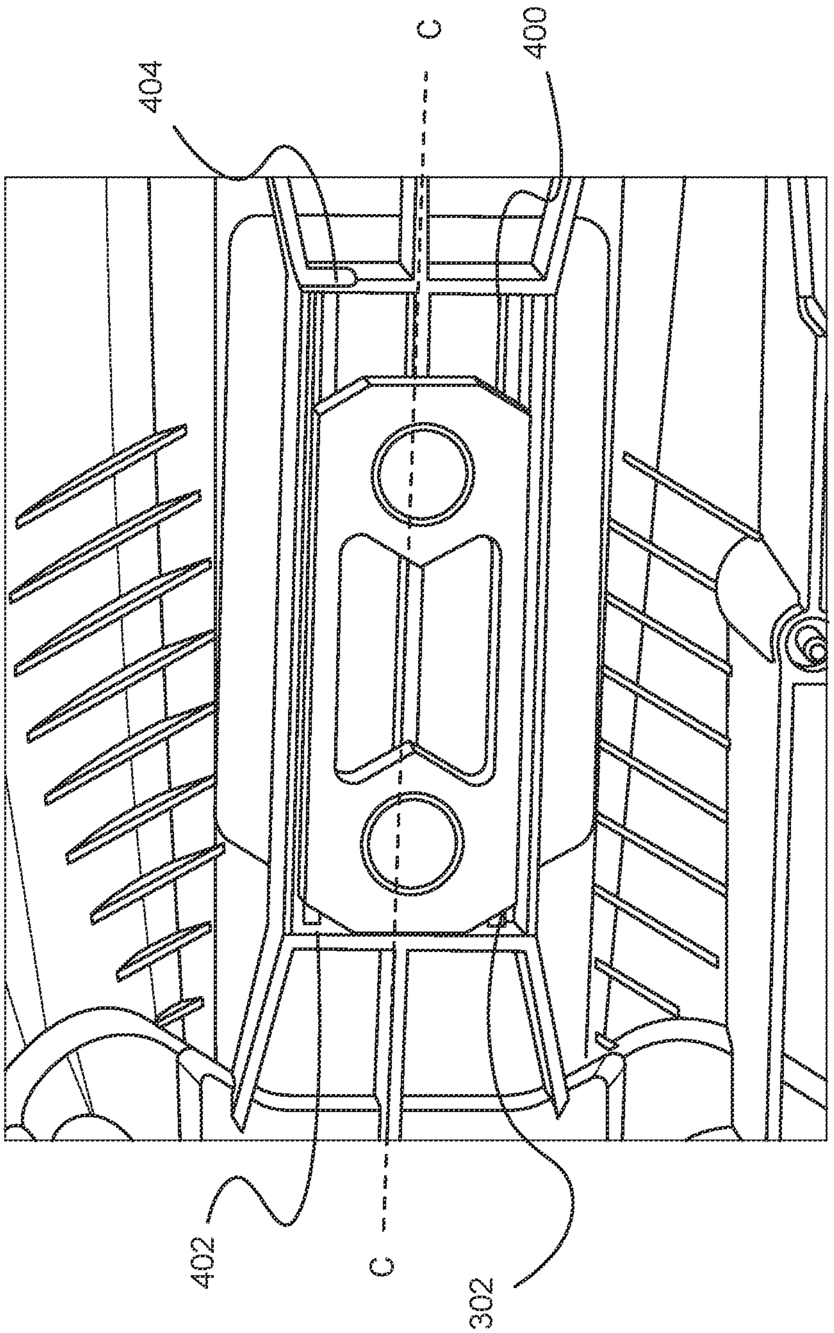
FIG. 4 shows a close-up partial perspective view of a housing of the power tool according to an embodiment.

In some examples the power tool 100 comprises a first limitation system 300 configured to limit the extent of the axial movement of the inner mechanism 200 with respect to the housing 102. The first limitation system 300 will now be discussed in reference to FIGS. 3 and 4. FIG. 3 shows a close-up partial perspective view of the inner mechanism 200 of the power tool 100 according to an example. FIG. 4 shows a close-up partial perspective view of the housing 102 of the power tool 100 according to an example.

The first limitation system 300 is mounted between the inner mechanism 200 and the housing 102. In some examples, the first limitation system 300 comprises a plurality of components mounted at different locations around the inner mechanism 200.

In some examples, the first limitation system 300 comprises a slider 302 mounted to the hammer assembly housing 206. The slider 302 is elongate and configured to slide in a groove or reciprocal recess 400 (as shown in FIG. 4) on the housing 102. The reciprocal recess 400 is substantially the same width as the slider 302 and comprises a longer length than the slider 302. This means that the slider 302 is permitted to slide within the reciprocal recess 400 from a first end 402 to a second end 404 of the reciprocal recess 400 in a constrained direction. As shown in FIG. 4, the slider 302 is positioned at the first end 402 of the reciprocal recess 400. When the power tool 100 is not actuated, the slider 302 will move to the first end 402 or the second end 404 depending on how the power tool 100 is orientated.

The limitation dampening system 300 in some examples provide axial limitations for the inner mechanism 200 and the housing 102 when the power tool 100 is in idle or too much force is applied to the housing 102 by the user. In the examples as shown in FIGS. 3 and 4, optionally the first limitation system 300 comprises limit stops e.g. the slider 302 abutting against the first end 402 or the second end 404 of the reciprocal recess 400.

During operation, the slider 302 will maintain a position between the first and second ends 402, 404 of the reciprocal recess 400.

In some examples the slider 302 is a rubber or silicone material. The slider 302 and the reciprocal recess 400 are orientated along a longitudinal axis C-C. In some examples, the longitudinal axis of the slider 302 and the reciprocal recess 400 are parallel or substantially parallel with the longitudinal axis B-B of the power tool 100. Accordingly, the first dampening system 300 is configured to prevent or limit vibration from the hammer assembly 204.

FIGS. 3 and 4 respectively show that the slider 302 and the reciprocal recess 400 are mounted on the inner mechanism 200 and the housing 102. However, in some alternative examples, the slider 302 and the reciprocal recess 400 are respectively mounted on the housing 102 and the inner mechanism 200.

During operation, the electric motor 700 may experience high load. This means that the electric motor 700 can heat up. In order to cool the electric motor 700 during operation the motor assembly 202 comprises a fan 216. In some examples, the fan 216 is directly mounted to the shaft of the electric motor 700. In some alternative examples (not shown) the fan 216 is operatively coupled to a gearbox (not shown). FIG. 2 only partially shows the fan 216 because the electric motor 700 and fan 216 are mounted within the motor housing 208. FIG. 8 schematically represents the electric motor 700 and fan 216 assembled together. The electric motor 700 and the fan 216 together will be referred as the motor-fan assembly 800.

The motor fan assembly 800 is configured to generate a cooling airflow path E from an air inlet 802 to an air outlet 804 via the motor fan assembly 800. The cooling airflow path E is indicated by a dotted line and a series of arrows. In this way, the motor-fan assembly 800 is configured to draw cooling air from outside the power tool 100 to cool the electric motor 700 during operation. The air inlet 802 and the air outlet 804 are positioned at different locations on the housing 102. In some examples the air inlet 802 is located on a first side 106 of the housing 102 and the air outlet 804 is located on a second side 808 of the housing 102. In other examples, the air inlet 802 and the air outlet 804 can be located at any position in the housing 102 such that the cooling airflow path E is via the motor fan assembly 800.

The cooling airflow path E as shown in FIG. 8 is exemplary and the cooling airflow path E can be any suitable path through the housing 102 from the air inlet 802 to the air outlet 804 via the motor fan assembly 800. In some alternative examples, the airflow direction can be optionally inverted. The airflow direction can be inverted by mounted the fan 216 rotated by 180 degrees to the fan as shown in FIG. 8. In this case, the air is drawn in via the air outlet 804 and exhaust at the air inlet 802. Accordingly, when the airflow direction is reversed, functionally the air inlet 802 will be an air outlet and the air outlet will be an air inlet.

The cooling airflow path E in some examples is guided within the housing 102 to the inner mechanism 200 via an internal wall 810. The internal wall 810 is fixed with respect to the housing 102. In this way, the inner mechanism 200 moves with respect to the internal wall 810. Whilst FIG. 8 only shows one internal wall 810, in other examples there can be any number of internal walls 810 to guide the cooling airflow path E through the housing 102. The internal wall 810 comprises an air hole 812 such that the cooling airflow path E can flow through the motor fan assembly 800.

Since the inner mechanism 200 moves with respect to the housing 102, the cooling airflow path is guided towards the motor fan assembly 800. The power tool 100 comprises at least one air conduit 220 located on the cooling airflow path E configured to guide the cooling airflow from the air inlet 802 to the motor fan assembly 800. The air conduit 220 is a hollow structure configured to guide the cooling airflow within the housing 102. The air conduit 220 can be rigid such as pipe structure or flexible such as a tubing, bellows, or sleeve structure. The air conduit 220 is any suitable structure for guiding the cooling airflow within the housing 102.

Figure 5:
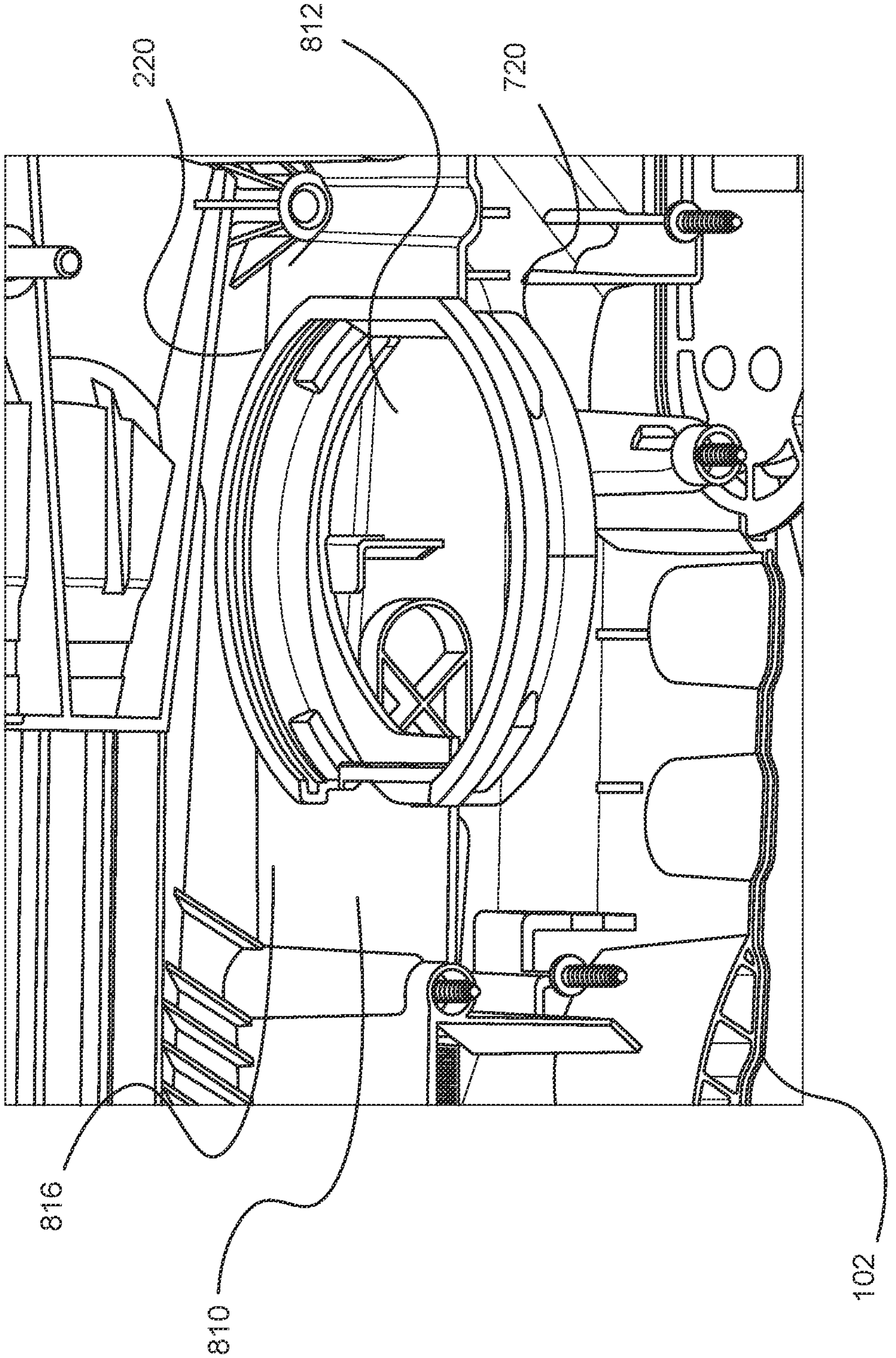
FIGS. 5 and 6 show a close-up partial perspective views of the power tool according to an embodiment.
Figure 6:
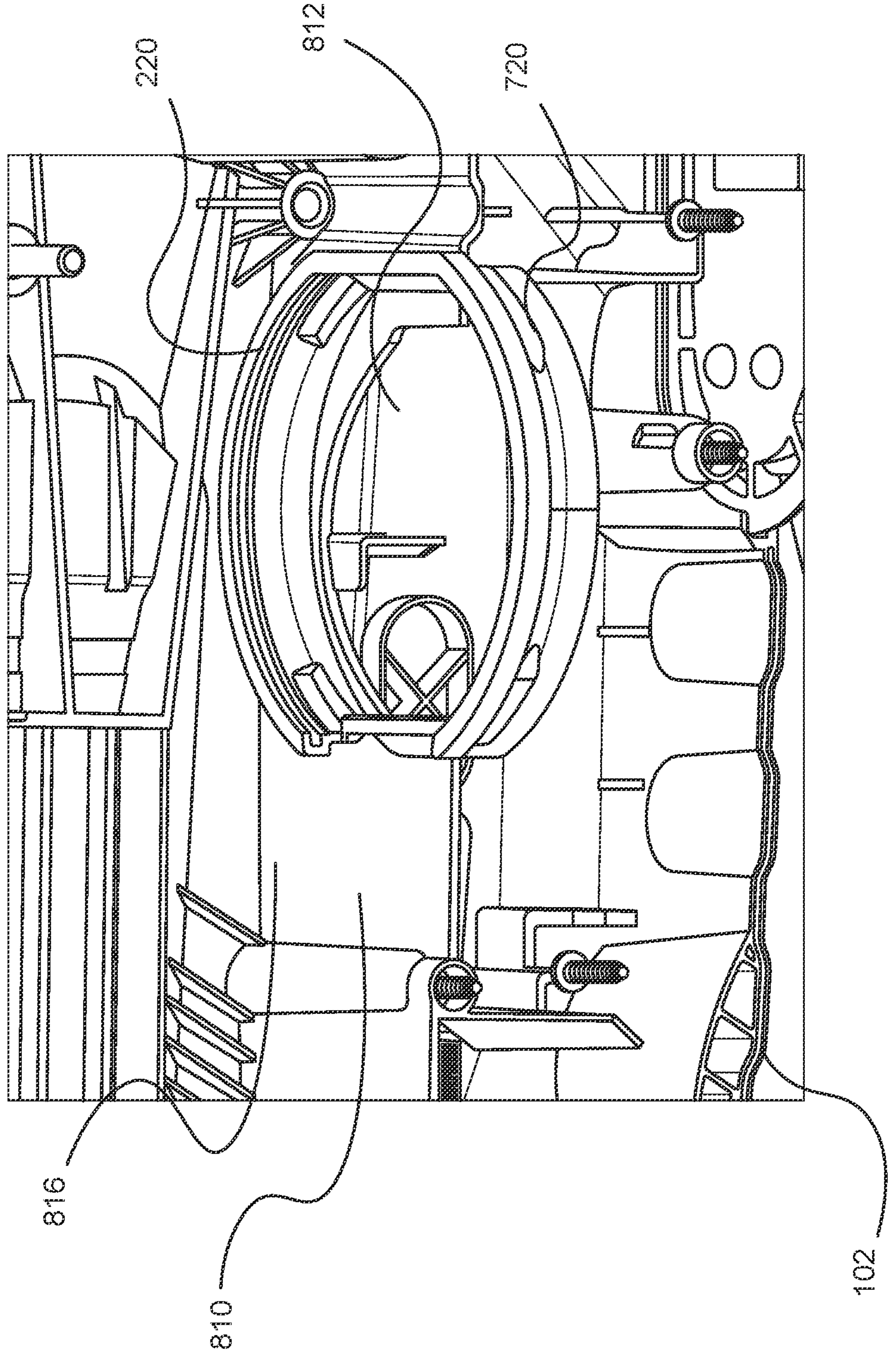
Figure 7:
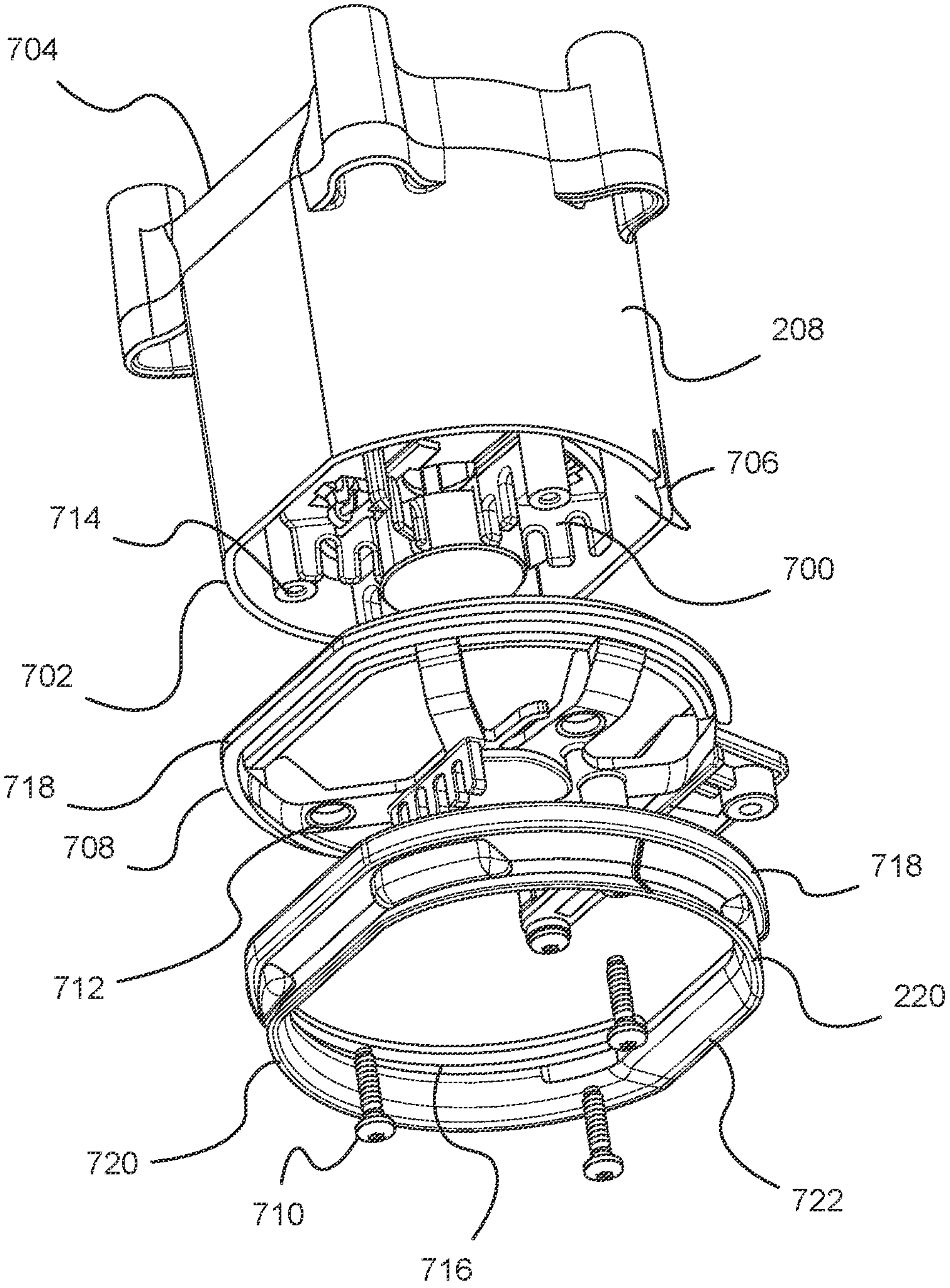
FIG. 7 shows an exploded perspective view of some components of the power tool according to an embodiment.
Figure 9:
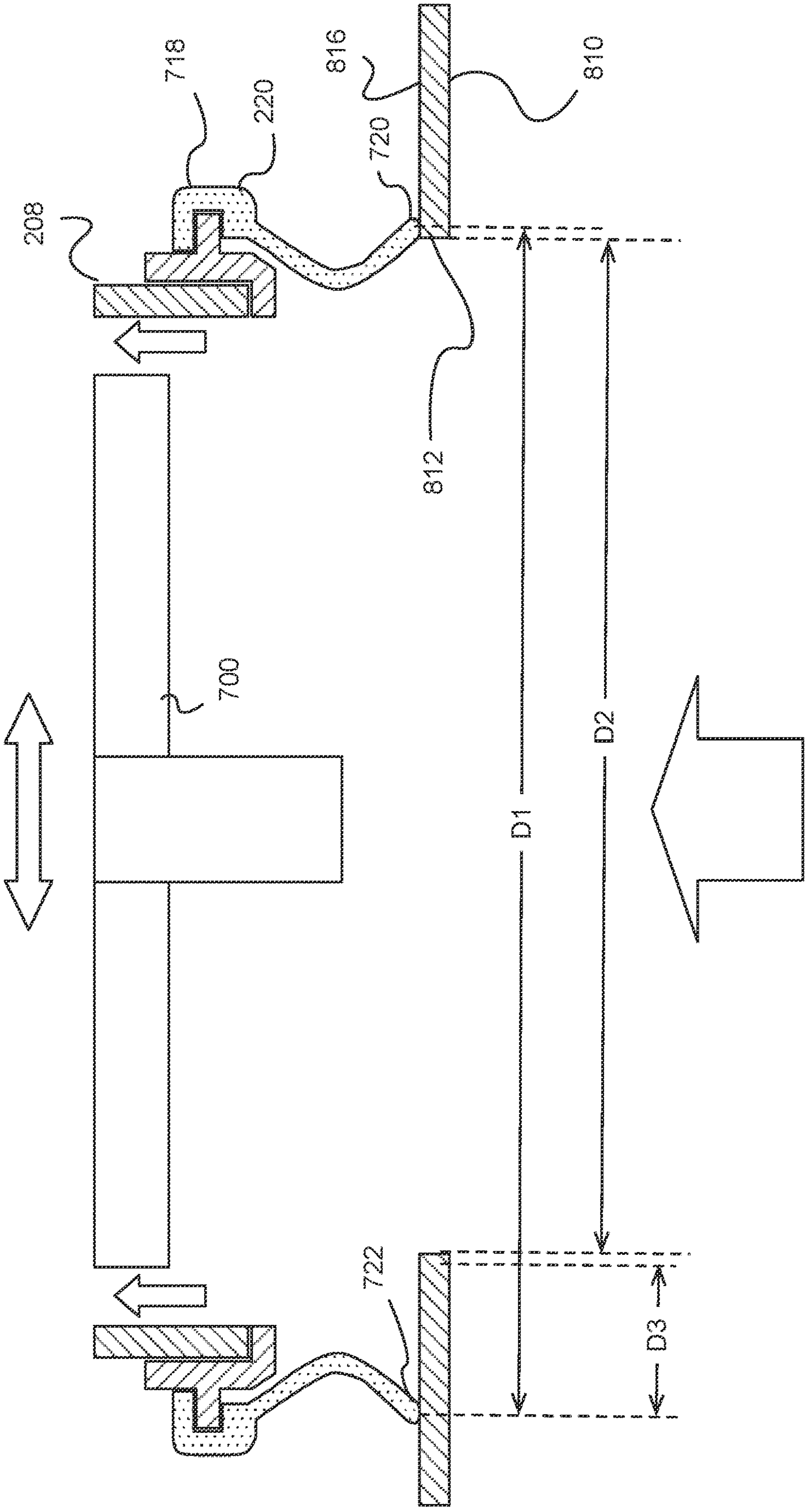
FIGS. 9, 10 and 11 show a schematic cross-sectional view of some components according to an embodiment.
Figure 10:
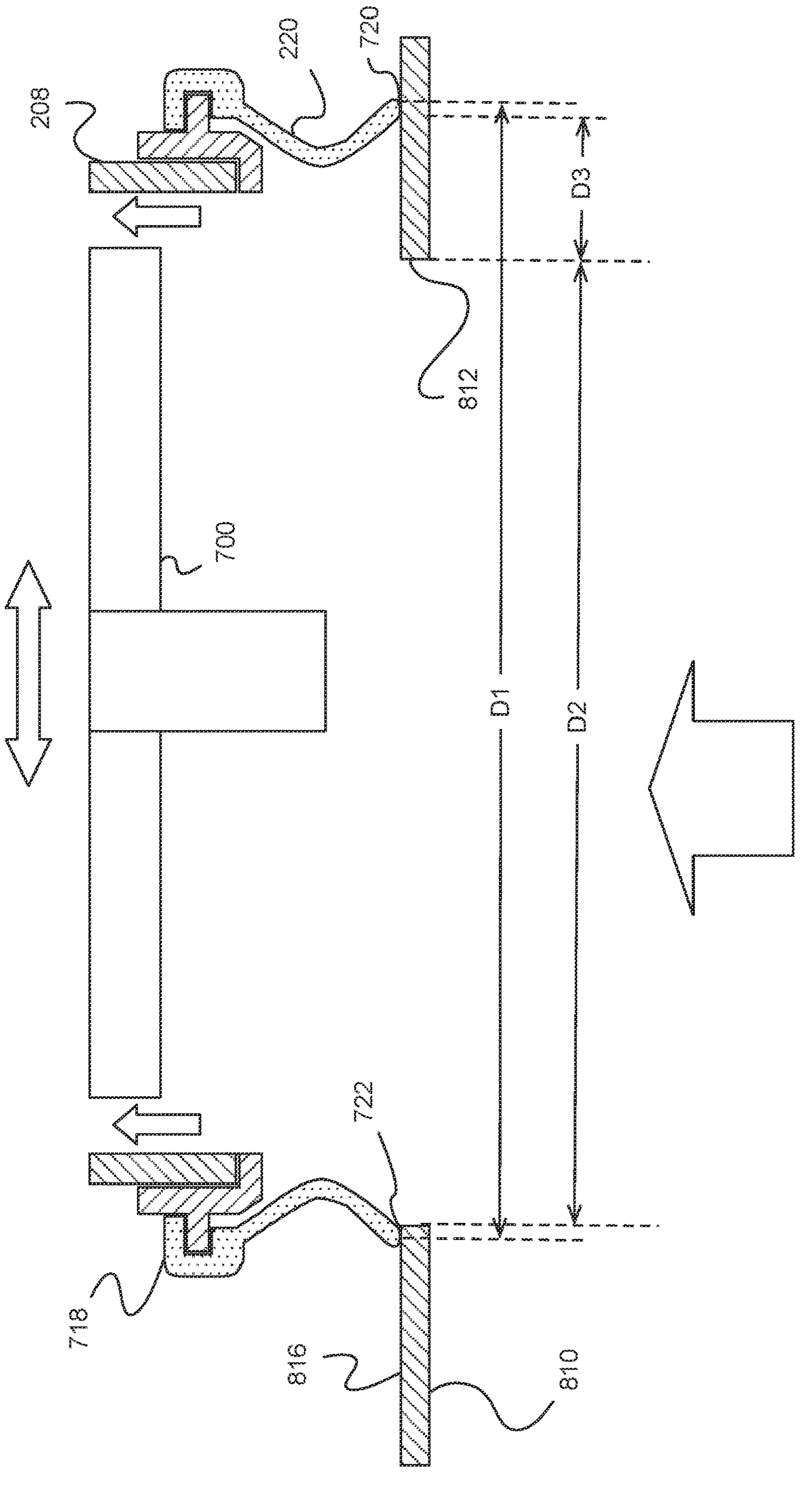
Figure 11:
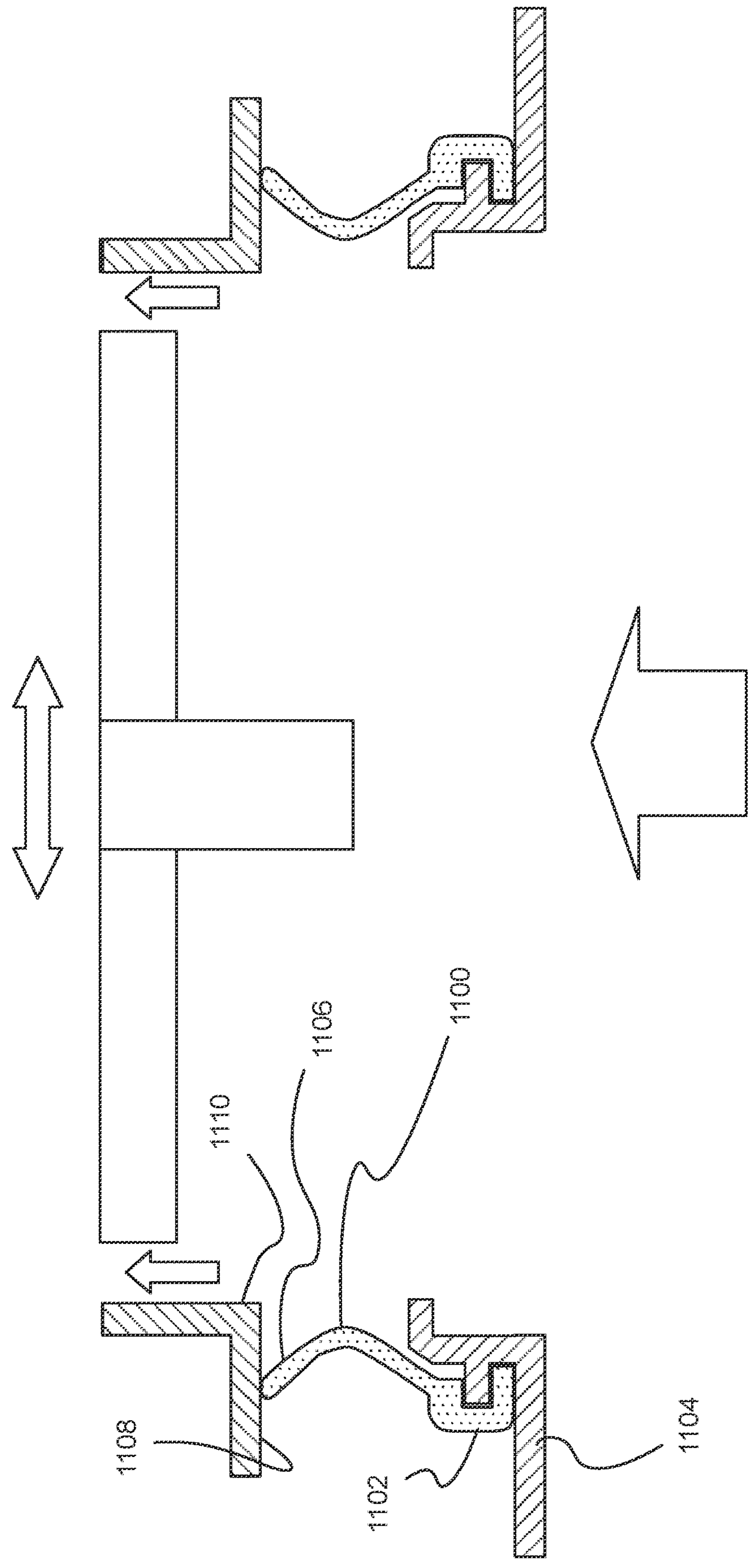

The at least one air conduit 220 will now be described in more detail in reference to FIGS. 5 to 11. FIGS. 5 and 6 show a close-up partial perspective views of the power tool 100 and the air conduit 220. FIG. 7 shows an exploded perspective view of the motor housing 208 of the power tool 100. FIGS. 9, 10 and 11 show a schematic cross-sectional view of the air conduit 220.

Reference will now be made to FIG. 7. The air conduit 220 comprises a first conduit end 718 and a second conduit end 720. The air conduit 220 is mounted at the first conduit end 718 on a first end 702 of the motor housing 208 via a motor housing frame 708. The motor housing frame 708 is fastened to the motor housing 208 via a plurality of fasteners e.g. screws 710. The screws 710 are inserted through fastening holes 712 and into threaded bores 714 in the motor housing 208.

Accordingly, the air conduit 220 is fixed to the motor housing 208 at the first conduit end 718.

The air conduit 220 comprises a circumferential groove 716 configured to engage a circumferential rib portion 718 on the motor housing frame 708. When the circumferential groove 716 is engaged with the circumferential rib portion 718 and the motor housing frame 708 is mounted to the motor housing 208, the air conduit 220 is secured to the motor housing 208. The circumferential groove 716 and the circumferential rib portion 718 can respectively be a single continuous circumferential groove 716 and a single continuous circumferential rib portion 718. This may be advantageous because the air conduit 220 can be better sealed against the motor housing 208 at the first conduit end 718 of the air conduit 220.

The circumferential groove 716 and the circumferential rib portion 718 can optionally respectively extend partially or fully around the air conduit 220 and the motor housing frame 708. In some other examples, the circumferential groove 716 and the circumferential rib portion 718 comprise a plurality (not shown) of discrete circumferential grooves 716 and circumferential rib portions 718.

This means that the motor housing 208 and the air conduit 220 are a unitary element and move together. Whilst FIG. 7 shows the air conduit 220 is mounted to the motor housing 208 via the motor housing frame 708, the motor housing frame 708 is optional in some examples. In this case the air conduit 220 is mountable directly on the motor housing 208. For example, the motor housing 208 comprises a circumferential rib portion 718 on which the circumferential groove 716 mounts.

In some other examples, the air conduit 220 is mountable to the motor housing 208 using other alternative fastenings. For example, the air conduit 220 is fastened to the motor housing 208 via screws 710, glue, clips, clamps, bolts and so on. In some other examples, the air conduit 220 is overmolded on to the motor housing 208. This means that the air conduit 220 can either be fixed directly to the motor housing 208 or fixedly indirectly via another component e.g. the motor housing frame 708.

The motor housing 208 is hollow and generally cylindrical in shape. The walls of the motor housing 208 extend from the first end 702 to a second end 704. The first end 702 and the second end 704 of the motor housing 208 is open and the motor housing 208 is configured to permit the cooling airflow therethrough. The motor housing 208 is configured to provide a circumferential void 706 between the electric motor 700 and the motor housing 208. This means that the cooling airflow can flow over the electric motor 700 and remove heat from the electric motor 700 during operation.

In some examples the air conduit 220 is flexible. In some examples the air conduit 220 is resiliently flexible. The air conduit 220 is optionally made from a rubber rubber-like materials, thermoplastic elastomers (TPE), or silicone material. This means that the air conduit 220 can deform during operation of the power tool 100.

Whilst the air conduit 220 as shown in the examples in the Figures is completely flexible, the air conduit 220 can be partially flexible (not shown) or completely rigid (not shown). In the example where the air conduit 220 is partially flexible, the air conduit 220 can comprise a rigid part and a flexible part. For example, the partially flexible air conduit 220 comprises a rigid pipe structure fixed to the motor housing 208 and a flexible sealing lip at one end (not shown) for engaging against part of the housing 102.

As mentioned above. The air conduit 220 is fixed at the first conduit end 718 to the motor housing 208. The second conduit end 720 is not fixed to any other elements of the power tool 100. This means that the second conduit end 720 is a free end. This means that the second conduit end 720 and the air conduit 220 is configured to be moveable with respect to the housing 102.

In some examples, the second conduit end 720 is configured to be slidably engageable with a portion of the housing 102. FIG. 8 shows the second conduit end 720 of the air conduit 220 slidable engageable with an inner surface 816 of the internal wall 810. It is preferred that the second conduit end 720 is in slidable engagement with the housing 102 because this provides a good seal and better guides the cooling air flow. However, in some less preferred examples, the second conduit end 720 of the air conduit 220 can be mounted adjacent to the portion of the housing 102 without touching the housing 102. In this example, the cooling air flow will mostly be guided by the air conduit 220, but some of the air within the housing 102 will be drawn into the motor fan assembly 800 and therefore the cooling effect will be lessened.

Whilst FIG. 8 shows that the air conduit 220 is slidably engageable with the internal wall 810, in other examples the air conduit 220 is slidably engageable with an inner surface 814 of the housing 102. In this case, the air conduit 220 will be moveably mounted in a location adjacent to air inlets 802. Accordingly, the air conduit 220 as shown in FIG. 8 can be modified to extend further from the motor fan assembly 800 to the inner surface 814 of the housing 102.

Turning back to FIG. 7, in some examples, the second conduit end 720 of the air conduit 220 optionally comprises a curved lip 722. The curved lip 722 allows for a good seal between the inner surface 816 of the internal wall 810 and the air conduit 220. Furthermore, the curved lip 722 is configured to wipe the inner surface 816 of the internal wall 810. This advantageously cleans dirt and debris from the inner surface 816 during operation. This means that the curved lip 722 can provide a good seal even when the worksite is very dirty. The curved lip 722 also prevents or limits warm air exhausted from the motor fan assembly 800 being recirculated through the motor fan assembly 800. This improves the cooling effect of the cooling air flow.

Movement of the air conduit 220 will now be discussed in reference to FIGS. 5, 6, 9 and 10. FIGS. 9 and 10 are close up views of the dotted box labeled F in FIG. 8. The motor fan assembly 800 is partially shown in FIGS. 9 and 10. FIG. 5 shows the air conduit 220 in sliding engagement with the inner surface 816 of the internal wall 810 of the housing 102. Part of the internal wall 810 has been removed in FIG. 5.

The air conduit 220 as shown in FIG. 5 is in a first position. In the first position, the air conduit 220 is sealed against the inner surface 816 and the second conduit end 720 completely surrounds the air hole 812. The first conduit end 718 as shown in FIG. 5 is connected to the motor housing 208, but the motor housing 208 is not shown for the purposes of clarity. FIG. 9 also shows the air conduit 220 in the first position.

FIG. 9 shows that the diameter D1 of the air conduit 220 is greater than the diameter D2 of the air hole 812. As mentioned above, this means that the air conduit 220 completely surrounds the air hole 812.

FIG. 6 shows the air conduit 220 in sliding engagement with the inner surface 816 of the internal wall 810 of the housing 102. Part of the internal wall 810 has also been removed in FIG. 6. The air conduit 220 as shown in FIG. 6 is in a second position. In the second position, the air conduit 220 is sealed against the inner surface 816 and the second conduit end 720 completely surrounds the air hole 812. The first conduit end 718 as shown in FIG. 6 is connected to the motor housing 208, but the motor housing 208 is not shown for the purposes of clarity. FIG. 10 also shows the air conduit 220 in the second position.

FIG. 10 shows that the diameter D1 of the air conduit 220 is greater than the diameter D2 of the air hole 812. As mentioned above, this means that the air conduit 220 completely surrounds the air hole 812.

As shown in FIGS. 9 and 10 the air conduit 220 is moveable between the first and second positions by a travel distance D3. The diameter D1 of the air conduit 220 is greater than the diameter D2 of the air hole 812 and the travel distance D3. This means that the curved lip 722 of the second conduit end 720 is always in contact with the inner surface 816 of the internal wall 810. Accordingly, as the air conduit 220 moves between the first and second positions as the inner mechanism 200 reciprocates during operation, the air conduit 220 maintains the seal.

During operation, the motor fan assembly 800 generates a negative pressure in the motor housing 208 and the air conduit 220. This helps the air conduit 220 to seals against the inner surface 816 of the internal wall 810 during operation of the power tool 100.

In some examples there are a plurality of air conduits 220 in fluid communication with the motor assembly 202. Each of the air conduits 220 functions in the same way as previously described, except that the air conduit 220 is mounted between the inner mechanism 200 and the housing 102 on different sides.

In some examples the air conduit 220 is configured to reciprocate in a direction parallel or substantially parallel with the longitudinal axis B-B of the power tool 100. By only moving in a direction parallel or substantially parallel with the longitudinal axis B-B of the power tool 100, the circumferential groove 716 remains engaged with the circumferential lip 718. This means that the air conduit 220 remains securely fastened to the motor housing 208. In addition, the air conduit 220 does not undergo constant compression and extension during operation of the power tool 100. This means that the air conduit 220 experiences less force and experiences less wear and does not need to be made from a hard-wearing material.

Turning to FIG. 11 another example will now be discussed. FIG. 11 shows a schematic cross-sectional view of an air conduit 1100. The example shown in FIG. 11 is identical to the examples shown in the previous Figures (e.g. FIGS. 9 and 10) except that the air conduit 1100 is fixed at the first conduit end 1102 to the internal wall 1104 of the housing 102. Instead, the air conduit 1100 comprises a second conduit end 1106 which slidably engages with a motor housing surface 1108. The motor housing surface 1108 is a protruding lip 1110 formed on the first end 702 of the motor housing 208. The second conduit end 1106 slidably engages the motor housing surface 1108 in the same way as discussed with respect to the previous examples. This means that the air conduit 1100 seals against the motor assembly 202 and ensures that the cooling air flow is guided over the electric motor 700. This means that the motor housing surface 1108 is wiped by the air conduit 1100 as the housing 102 and air conduit 1100 move with respect to the inner mechanism 200.

In another example, two or more examples are combined. Features of one example can be combined with features of other examples.

Examples of the present disclosure have been discussed with particular reference to the examples illustrated. However, it will be appreciated that variations and modifications may be made to the examples described within the scope of the disclosure.

The invention claimed is:

1. A power tool comprising:

a housing;

an inner mechanism mounted at least partially within the housing and configured to be reciprocally moveable with respect to the housing, the inner mechanism having a motor fan assembly;

an air inlet and an air outlet positioned in the housing and a cooling airflow path extending between the air inlet and the air outlet via the motor fan assembly; and at least one air conduit located on the airflow path configured to guide the cooling airflow from the air inlet to the motor fan assembly, wherein a first end of the air conduit is fixed and a second end of the at least one air conduit is a free end that is not directly fixed to other elements in the power tool.

2. The power tool of claim 1, wherein the first end of the at least one air conduit is fixed with respect to the motor fan assembly.

3. The power tool of claim 1, wherein the second end of the at least one air conduit is moveable with respect to the housing.

4. The power tool of claim 1, wherein the at least one air conduit is flexible.

5. The power tool of claim 1, wherein the at least one air conduit comprises a rubber, rubber-like materials, thermoplastic elastomers (TPE), or silicone material.

6. The power tool of claim 1, wherein the at least one air conduit comprises a pressure differential with respect to atmospheric pressure when the motor fan assembly is actuated.

7. The power tool of claim 1, wherein the inner mechanism is configured to reciprocally move in a direction parallel with a longitudinal axis of the power tool.

8. The power tool of claim 1, wherein the air inlet is mounted on a side of the housing.

9. The power tool of claim 1, wherein the inner mechanism comprises at least one dampener configured to engage the housing when the inner mechanism moves with respect to the housing.

10. The power tool of claim 1, wherein the first end of the air conduit comprises a groove configured to mount on a reciprocal projecting rib on a motor housing of the motor fan assembly.

11. The power tool of claim 1, wherein the power tool is a demolition hammer, plunge saw, a reciprocating saw, a circular saw, an impact driver, a drill, a hammer drill, a multitool, an oscillating tool, a rotary hammer, a chipping hammer, a plate compactor, a rammer, a tamper, a soil compactor, a pavement breaker or any other power tool.

12. A power tool comprising:

a housing;

an inner mechanism mounted at least partially within the housing and configured to be reciprocally moveable with respect to the housing, the inner mechanism having a motor fan assembly;

an air inlet and an air outlet positioned in the housing and a cooling airflow path extending between the air inlet and the air outlet via the motor fan assembly; and at least one air conduit located on the airflow path configured to guide the cooling airflow from the air inlet to the motor fan assembly, wherein a first end of the air conduit is fixed and a second end of the at least one air conduit is a free end, and wherein the second end of the at least one air conduit is slidably engageable with an inner surface of the housing.

13. The power tool of claim 12, wherein the second end of the at least one air conduit is configured to form a seal against the inner surface of the housing.

14. The power tool of claim 13, wherein the second end of the at least one air conduit comprises a lip configured to wipe the inner surface of the housing.

15. The power tool of claim 13, wherein the inner surface comprises an air hole.

16. The power tool of claim 15, wherein the second end of the at least one air conduit is configured to move from a first position to a second position and the second end covers the air hole.

17. A power tool comprising:

a housing;

an inner mechanism mounted at least partially within the housing and configured to be reciprocally moveable with respect to the housing, the inner mechanism having a motor fan assembly;

an air inlet and an air outlet positioned in the housing and a cooling airflow path extending between the air inlet and the air outlet via the motor fan assembly; and at least one air conduit located on the airflow path configured to guide the cooling airflow from the air inlet to the motor fan assembly, wherein a first end of the air conduit is fixed and a second end of the at least one air conduit is a free end, wherein the at least one air conduit comprises bellows.

18. A power tool comprising:

a housing;

an inner mechanism mounted at least partially within the housing and configured to be reciprocally moveable with respect to the housing, the inner mechanism having a motor fan assembly;

an air inlet and an air outlet positioned in the housing and a cooling airflow path extending between the air inlet and the air outlet via the motor fan assembly; and at least one air conduit located on the airflow path configured to guide the cooling airflow from the air inlet to the motor fan assembly, wherein a first end of the air conduit is fixed and a second end of the at least one air conduit is a free end, wherein the at least one air conduit is configured to slidably engage with an inner surface of the housing in a direction parallel with the longitudinal axis.

* * * * *